United States Patent [19]
Fort et al.

[11] 4,217,862
[45] Aug. 19, 1980

[54] HIGH CONSTANT PRESSURE, ELECTRONICALLY CONTROLLED DIESEL FUEL INJECTION SYSTEM

[75] Inventors: Leonard N. Fort, Burton; Albert F. Albert, Bellevue; Edward P. Darragh, Kent, all of Wash.

[73] Assignee: Combustion Research & Technology, Inc., Seattle, Wash.

[21] Appl. No.: 781,766

[22] Filed: Mar. 28, 1977

[51] Int. Cl.² .................. F02M 39/00; F02M 41/16
[52] U.S. Cl. ................................ 123/472; 123/497; 123/501
[58] Field of Search ........ 123/139 AE, 139 E, 32 AE

[56] References Cited
U.S. PATENT DOCUMENTS

| | | | |
|---|---|---|---|
| 3,913,537 | 8/1975 | Ziesche et al. | 123/139 E |
| 4,046,112 | 10/1975 | Deckard | 123/139 E |
| 4,129,256 | 9/1977 | Bader, Jr. et al. | 123/139 E |

Primary Examiner—Stephen C. Bentley
Assistant Examiner—Thomas H. Webb
Attorney, Agent, or Firm—Cole, Jensen & Puntigam

[57] ABSTRACT

Diesel fuel injection system in which a standing high-pressure wave is maintained in the common rail and which utilizes injectors which function as gates or valves. Electronic controls sensitive to engine demands based on speed and load electronically control the injectors to vary both moment and duration of fuel injection time. Input signals, as determined by engine speed by way of the distributor, vary the injection timing according to an advance curve at the distributor correlated to piston position. Duration of the injection cycle (quantity of fuel injected) is controlled electronically and variably in relation to throttle position.

29 Claims, 16 Drawing Figures

HIGH CONSTANT PRESSURE, ELECTRONICALLY CONTROLLED DIESEL FUEL INJECTION SYSTEM

BACKGROUND OF THE INVENTION

The invention relates generally to the field of injection systems for compression ignition engines and more particularly to a constant high pressure, electronically controlled fuel injection system for delivering fuel through valve or gate type injectors.

Those skilled in the art are aware that hitherto known mechanically actuated or mechanically operated injection systems have numerous problems which affect engine performance characteristics. One such problem is the fixed time of injection; and another is the lack of ability to vary the amount of fuel injected with respect to engine speed and/or load. Still another is the pressure under which fuel is injected inasmuch as pressure is a function of the speed of the engine. As a result, such known systems impose constraints on the engine which are decidedly detrimental. Among these are vibrations, unfavorable burning characteristics of the fuel over a wide range of the engine speed range, and poor emissions management to name the most obvious. So far as the burning characteristics of the fuel are concerned, such known systems affect the completeness of the combustion, flame propagation burning characteristics and flame speed. There are few systems which depart from the basic undesirable design deficiencies of mechanical systems and even these depart only from some of those deficiencies. A jerk pump type system, for instance, is pressure differential actuated and while it approaches constant pressure it is not high pressure, and does not vary the time at which injection is begun with sufficient advance for higher engine speeds nor does it vary the amount of the fuel injected from cycle to cycle. Cam timed injection systems involve pressures generated within the injector, but the pressures attained are dependent on the speed of the engine. Neither system is able to respond to variable engine demands in accordance with speed and load. The net result of the known systems is that there is only a small portion of the total operating engine range in which the engine operates efficiently. In otherwords, there is a very slight percentage of engine speed at which the engine will run with optimum efficiency. To sum up, mechanical systems have an injection timing constant, that is, the instant and duration of fuel injected and the constraints this constant imposes are recognized deficiencies.

Among the prior art references to be considered are the following: U.S. Pat. Nos. 3,430,616; 3,913,536; 3,752,137; 3,653,365; and 3,587,547.

SUMMARY OF THE INVENTION

The invention relates to an injection system for diesel engines in which a standing high pressure wave of fuel is maintained in the common rail through an accumulator which absorbs the shock waves from the pumping mechanism. A smaller accumulator chamber is built in the injector body as close as possible to the combustion chamber to minimize the time needed for fuel to react to the opening of the injector. A pressure regulator (relief value) downstream of the pumping mechanism enables a constant predetermined pressure to be maintained in the common rail. Excess fuel from the common rail is passed through the pressure regulator/relief valve and back to the fuel tank. An electronic distributor generates pulses in relation to engine speed and piston position which are fed to an input signal conditioner. From there the signals are applied to a cylinder counter, then a counter decoder and thence to output couplers and solenoid drivers for the injector solenoids. Signals are also introduced into the controls by throttle position to an overspeed and throttle control and thence to a pulse width modulator. The electronic controls, with the inputs from the distributor with related advance mechanisms and throttle position establish an advance curve for injection timing and determine the duration of the injection in accordance with engine speed and load. Signals from the electronic control unit, as stated above, are directed to injectors which in effect are valving mechanisms opened and closed by solenoids actuated by the electronic controls. The solenoids operate the plunger, which when driven causes the valve to open for injecting at a time as specified by the electronic controls and for remaining open for a finite duration also as specified by the electronic controls.

Accordingly, it is among the many features and advantages of the instant invention to provide a unique and novel injector system, fuel injecting mechanism, and electronic control unit. The system regulates degrees of advance of injection, the duration of injection time, and amount of fuel injected under constant high pressure according to engine demands, such as speed and load. It is a further object of the invention to provide a system which injects finely atomized fuel at the optimum time in the firing cycle, as determined by piston position and speed and by flame propagation and speed and thus to cause and obtain a maximum amount of work through efficient combustion of the diesel fuel. The controls make provision for an advance curve based on the "lag time", that is, that time from injection to ignition, and to inject a fuel at the most desirable point with respect to piston position and speed.

The injector of this invention is electronically actuated and hydraulically operated and is not a pressure generating device but acts as a gate valve which disperses the fuel in a finely divided or atomized manner. The distributor is appropriately geared to the engine to deliver electronic signals to the control unit so as to trigger each injector in proper sequence at the proper degrees of advance and to deliver the proper amount of fuel. Regardless of engine speed, the injectors of this invention hold the fuel under standing pressure from the common rail for release at the proper time. It also holds fuel in a critical position in its configuration which tends to cool the injector dispersal valve by absorbing heat of combustion and thus to preheat subsequent fuel charges. In this way, the fuel is controlled up to a point near to the actual fuel dispersal location, and reduces lag in fuel timing to accurately and precisely inject fuel. The injectors involve small movement values of internal parts having small mass to increase their operating life and which because of their simplicity will require reduced maintenance. The instant system, because of more efficient combustion, will reduce exhaust emissions under all types of engine running or idling conditions. The system will enable a diesel engine to operate over a longer or broader power range of usable speeds with minimum loss of efficiency due to detonation or preignition at lower speeds and so there is less loss of power throughout engine speeds due to improper amounts of fuel and inefficient timing of the injection process.

DESCRIPTION OF PREFERRED EMBODIMENT

Figure 1:
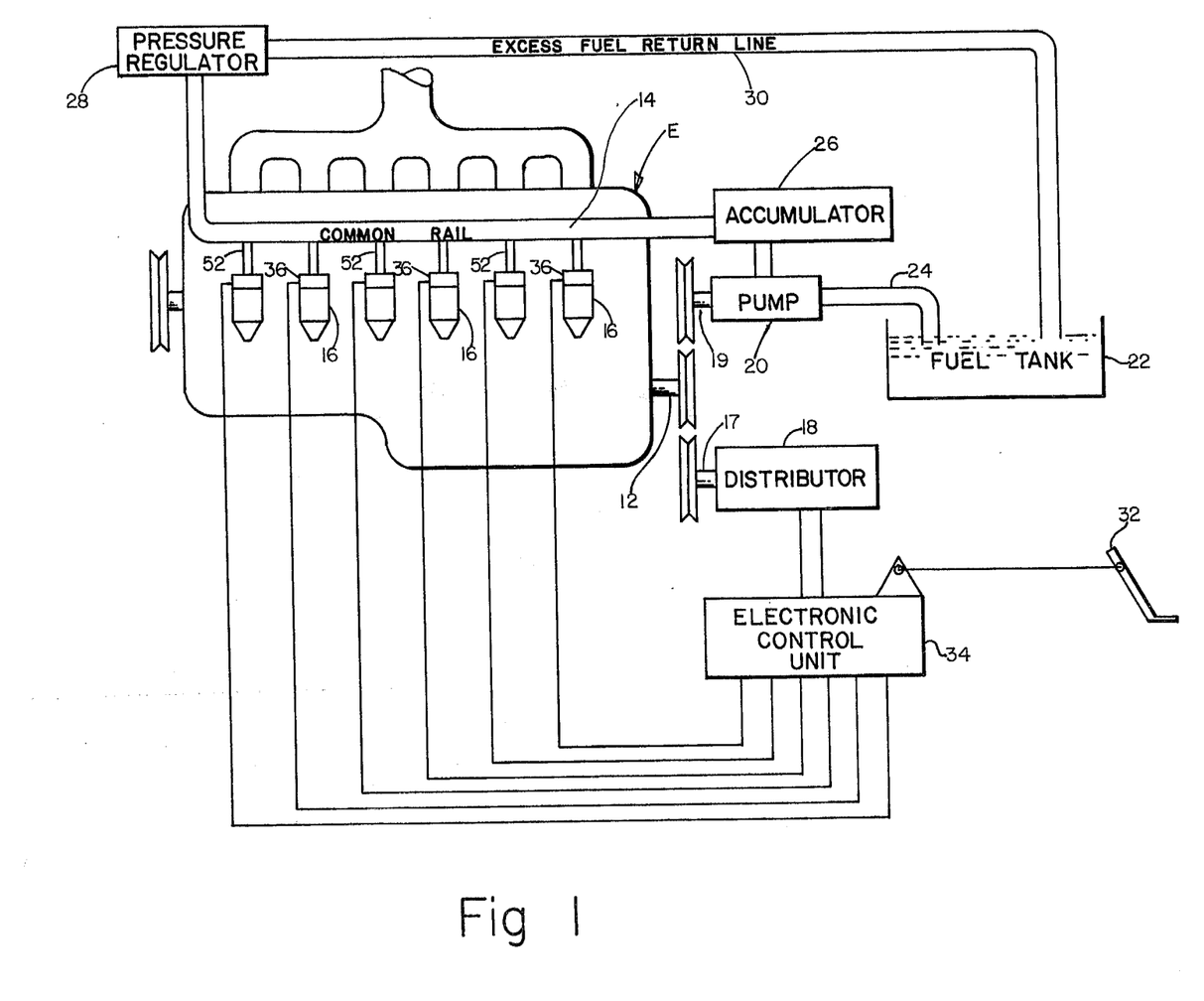
FIG. 1 is a diagramatic view illustrating the overall system of this invention.

FIG. 1 shows a diesel engine E having an output shaft 12, common rail 14 and injectors 16. Power takeoff shafts 17 and 19 drive the distributor 18 and pump 20 respectively. Diesel fuel is taken from tank 22 via line 24 to the pump where it is directed on the pressure side through accumulator 26 and into the common rail 14. A standing high pressure wave is maintained in the common rail up to and including the injectors 16 and a pressure regulator/relief valve 28 sets the pressure at which the system will function. Excess fuel is returned via line 30 to the fuel tank 22. Throttle 32 is linked to electronic control unit 34 which actuates solenoids 36 mounted on and for operation of injectors 16. The electronic control unit receives its input signals from the distributor 18 and interprets those signals by the throttle position of throttle 32.

Details of the unique and novel injector of the system are found in FIGS. 2-6. The injector, designated by the number 40, has a cylindrical body portion generally designated by the number 42. At the upper end thereof is a solenoid support section 44 which is threaded internally as at 45 for receiving the solenoid to be described hereinafter. Below solenoid support section 44 is a radially enlarged fuel line connection section 46 having internal threads 48 for receiving a fuel line connection 50 and fuel delivery line 52. Below the fuel line threads 48 is a filter cavity 54. The main housing 42 of the injector has a lower body section 56 which terminates at lower end 58. Body 42 internally contains bore 60 which extends generally from section 46 through the lower end 58. The lower portion of body 42 is threaded as at 62 for purposes which will be explained more fully hereinafter. A fuel delivery passage 64 extends from cavity 54 and opens into bore 60 by a passage 66 which interconnects with passage 64.

A plunger member generally designated by the number 70 which is an elongated cylindrical member is slidably received in bore 60 and has an upper end 72 and a lower end 74. The upper end 72 extends from near the top of section 46 to near the lower end of bore 60 and terminates at its lower end 74 above the threaded section 62 at the lower end of the body. A peripheral fuel delivery groove 76 extends around the circumference of the plunger to interconnect with passage 66 in the body. Four radially extending passages 78 connect to groove 76 and extend into the center of the plunger to intersect and to connect with a vertical central passage 80. It will also be seen at the upper end of the plunger that it includes a cavity 82 at least the upper portion 84 of which is threaded to receive the solenoid to be described more accurately hereinafter. Referring again to the lower end of the plunger 70, it will be seen that central vertical passage 80 opens into a larger accumulator chamber 86 which extends longitudinally downwardly inside the plunger 70. An internally threaded section 88 opening from lower end 74 of the plunger is radially or diametrically larger than the cavity 86 and threadably receives a ball check seat member 90 having conical seat 92 for receiving checkball 94. The seat 92 can be seen to angle inwardly and downwardly to define the conical surface 92 which ball 94 engages. A ball seat passage 96 opens from the seat and out the lower end into a delivery reservoir chamber 98. Reservoir 98 and cavity 116 together form in effect a common chamber.

Figure 2:
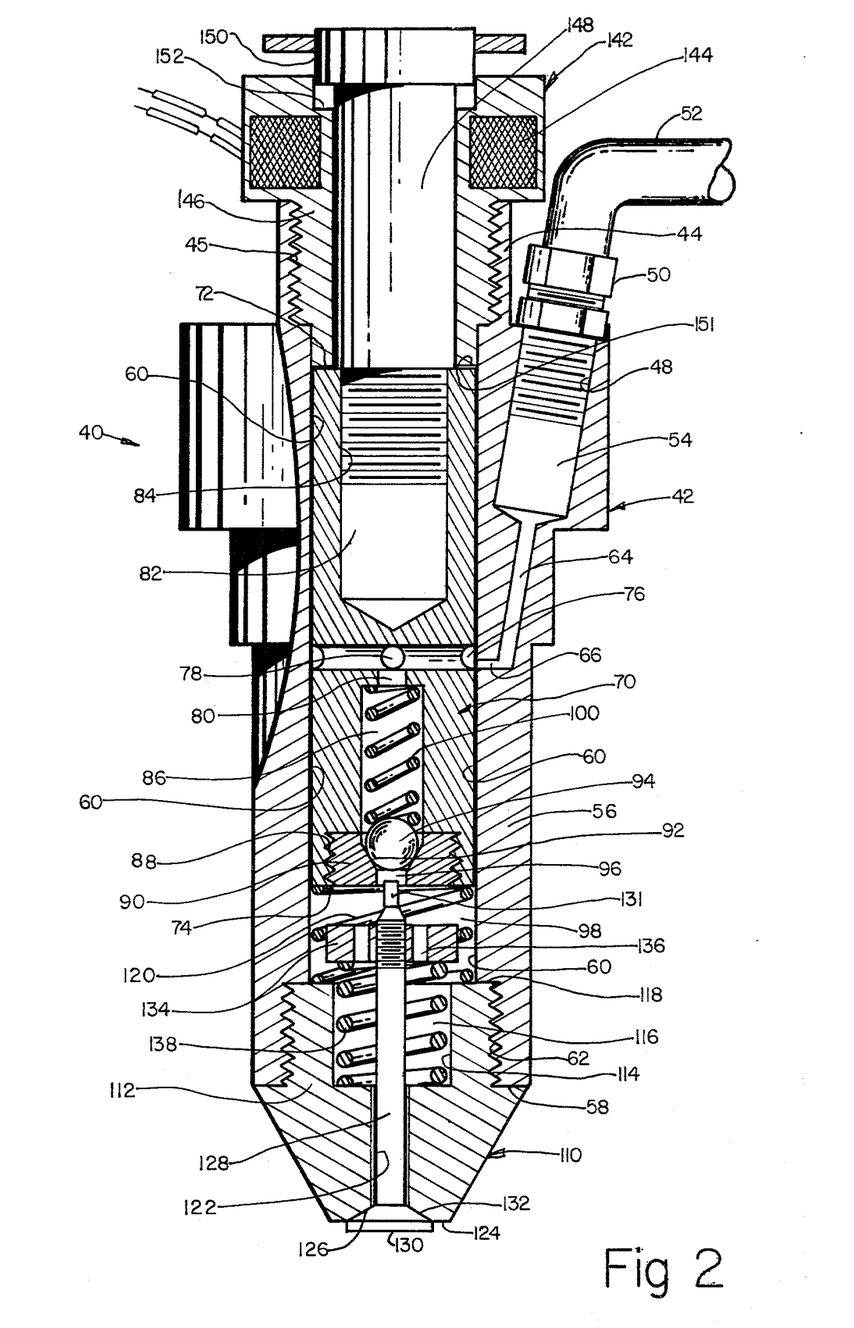
FIG. 2 is a cross-sectional view of the injector with the dispersal valve and check ball in the seated or closed position.
Figure 3:
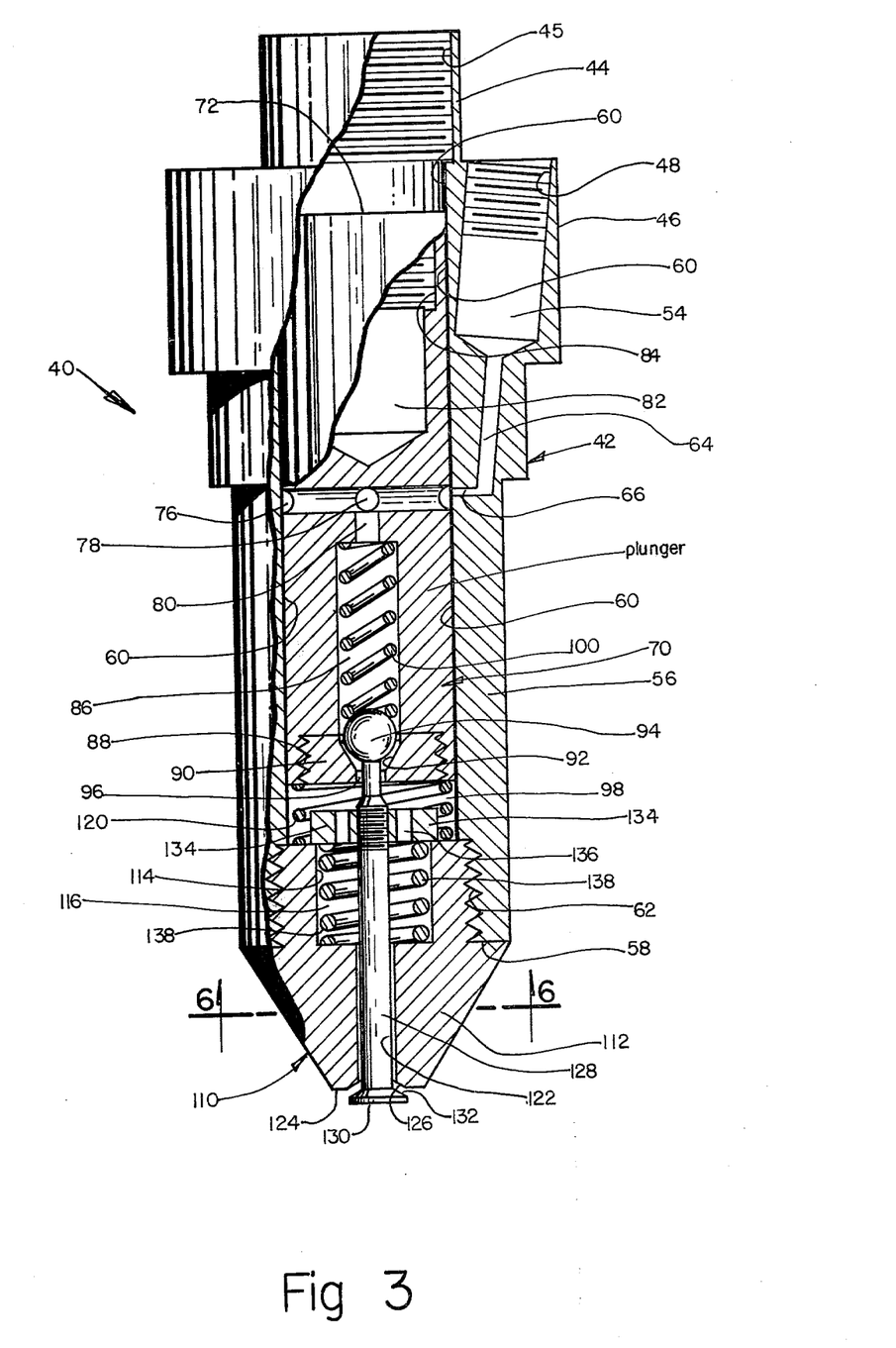
FIG. 3 shows a cross-sectional detail of the injector with the dispersal valve and check ball unseated or open.
Figure 4:
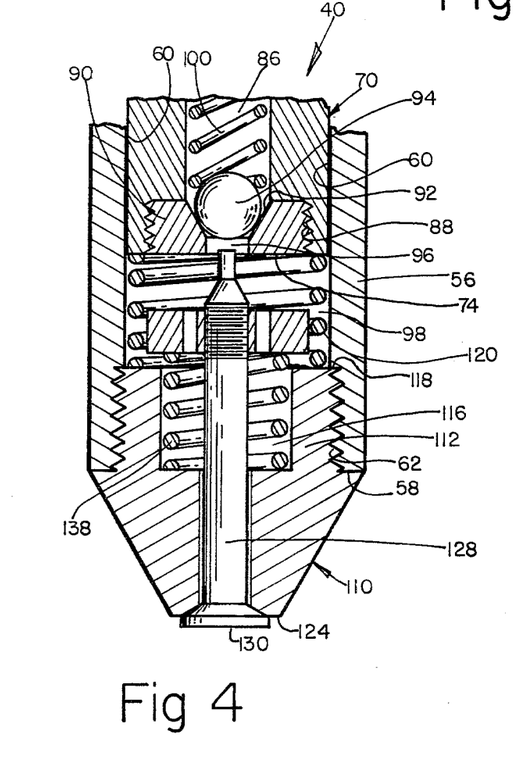
FIG. 4 shows a partial cross-section view of the lower end of the injector with the valve portion and check ball thereof closed.

An injector tip member designated by the number 110 is generally frustoconically shaped beginning at lower end 58 of the injector body. An upwardly extending threaded portion 112 is received on threads 62. The threaded portion 112 is designed to include an interior bore 114 defining a spring cavity 116. It will be noted that cavity 116 in the injector tip 110 is of smaller diameter than cavity 98 as defined by bore 60 in the injector body. Thus the upper edge 118 of the threaded portion 112 of the injector tip forms an inwardly offset surface on which seats the plunger return spring 120 for biasing plunger 70 into its up or closed position. A valve bore 122 extends from cavity 116 to near the lower end 124 of the injector tip 110. It will be noted that at the lower end 124 of tip 110 and adjacent the valve bore opening 122 is an upwardly and inwardly angled dispersal surface 126. A valve stem member 128 extends upwardly from valve head 130, said head having a coacting angled surface 132 for seating against injector tip dispersal surface 126. Stem 128 extends through passage 122, upwardly through cavity 116 and extends into delivery reservoir chamber 98. The upper end of valve stem 128 is threaded so as to receive a valve retaining and adjustment nut 134 in the shape of a shallow cylinder with a plurality of fuel passages 136. The valve retaining nut 134 is of larger diameter than cavity 116 but of smaller diameter than cavity 98. Thus the plunger return spring 120 is able to be accommodated in the annular space between bore 60 and the outside surface of valve retaining nut 134. A valve return spring 138 is disposed in cavity 116 and bears against the lower surface of the valve retaining and adjustment nut 134 to bias head 130 into its closed position. Fuel delivery channels 140, reference being had to FIG. 6, allow fuel to pass downwardly from chamber 116 to be dispersed from the injector under the pressure maintained in the common rail.

Referring once again to the top of the injector 40 as best seen in FIGS. 2 and 3, a solenoid generally referred to as 142 has an electric coil portion 144 and an injector engaging portion 146 to be threadably received in the threads 45 at the upper end of the injector. The solenoid, of course, contains electric coil 144 for effecting movement of the core member 148. The lower end of core 148 is threadably engaged with the internal threads 84 at the upper end of the plunger 70. A stop section 150 at the upper end of core 148 adjusts the amount of travel of the core so that stop member 150 will engage a surface 152 in solenoid 142. In this instance, the distance which the core 148 will move downwardly when the solenoid is actuated is in the range of about 0.020 inches which movement, of course, is imparted to the plunger 70 when the solenoid is actuated. Spring 120 in cavity 98 will return the plunger to its up position when the solenoid 142 is de-energized. A stop section at the lower end of solenoid 142 is formed as at 151. Said stop 151 is to prevent plunger 70 from exceeding the desired amount of upward movement when solenoid 142 is de-energized and forced upward into closed position by spring 120.

Figure 5:
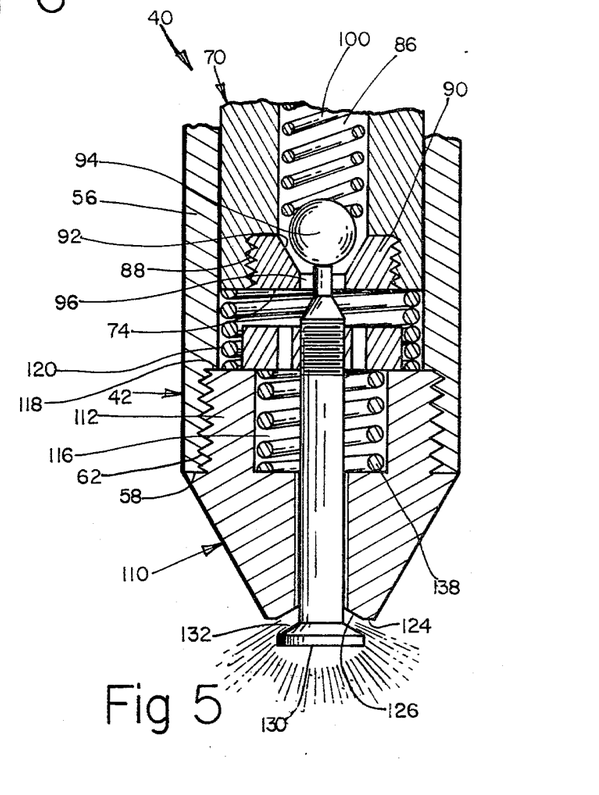
FIG. 5 is a partial cross-section view of the lower end of the injector with the check ball and dispersal valve open.
Figure 6:
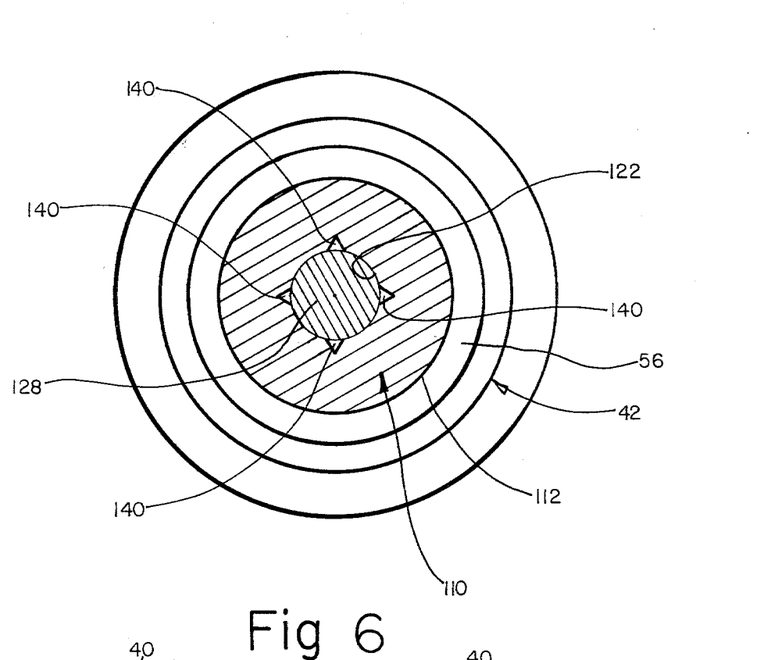
FIG. 6 is a cross-sectional view taken along the line 6—6 of FIG. 3 to further illustrate details of construction of the injector tape.

Operation of the injector will now be explained. Fuel under constant high pressure, and preferably in the range of about 20,000 psi, enters the injector through line 52, filter cavity 54 and thence through passages 64 and 66 to the peripheral groove 76 in the plunger. The pressure which obviously may be less than or greater than 20,000 psi may be varied or adjusted by pressure regulator/relief valve 28. The fluid continues through the inwardly extending radial passages 78 to vertical central passage 80 and thence to the accumulator chamber 86. It will be appreciated that plunger return spring 120 biases the plunger upwardly into the position shown in FIGS. 2 and 4 and that check ball spring 100 holds the ball down in its seated position as shown in the same figures. Likewise, the valve return spring 138 holds the valve 130 closed. When solenoid 142 is energized, core 148 moves downwardly the distance allowed by stop member 150 and the stop surface 152. In this manner, the solenoid core 148 and the plunger 70 move down approximately 0.020 inches though this amount is adjustable by position nut 134 on valve stem 128. By the time the plunger has moved from 0.002 to 0.004 inches ball 94 will have incountered tip 131 of the valve stem and unseated. As the ball is unseated by the downward movement of the plunger the highly pressurized fluid enters the delivery chamber 98 and forces the valve retaining and adjustment nut 134 downwardly against its spring 138 thus moving the valve stem 128 downwardly and opening the valve head 130 as shown in FIGS. 3 and 5. Fuel will continue to be delivered in a 360° conical fine spray pattern as can be appreciated because of the shape of dispersal surface 126 and coacting valve surface 132. When the solenoid is de-energized, the plunger return spring 120 forces the plunger upwardly to seat the ball and thus confine the pressurized fluid to the area above the ball. Thus it will be appreciated that the incoming passage 66 in the body of the injector is never closed to contact with the fuel delivery groove 76.

Figures 7, 8:
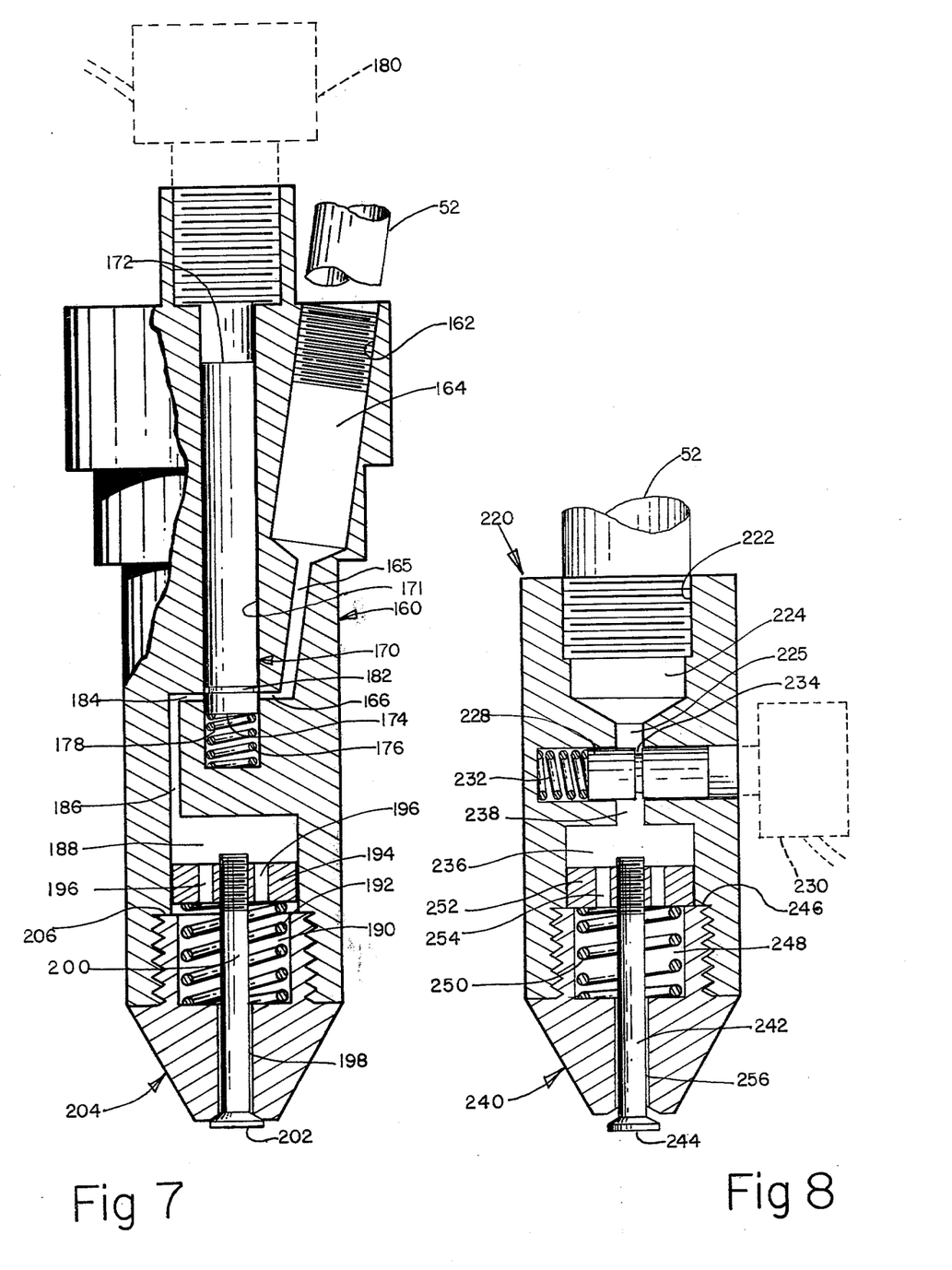
FIGS. 7 and 8 illustrate alternative embodiments of the injector.

FIGS. 7 and 8 show two alternative embodiments of the injector mechanism. FIG. 7 shows injector body 160 having connector threads 162 for receiving connection fittings to the fuel line 52. The pressurized fuel passes through filter cavity 164, through line 165 and into passage 166. In this embodiment, an elongated plunger, generally designated by the number 170, is of substantially less diameter and mass than the plunger of the first embodiment and is slidably received in plunger cavity 171. It has upper end 172 and a lower end 174 which engages a plunger return spring 176 located in or at the lower end of the plunger cavity 178. A soldnoid 180 is provided at the top of the injector body and connects to the upper end 172 of the plunger. A peripheral fuel delivery groove 182 is located near the lower end of plunger 170 which is closed or moved out of contact with the passage 166 when the injector is inoperative and return spring 176 is holding the plunger in its off position. Fuel passages 184 and 186 direct the fuel to delivery reservoir chamber 188. A valve spring return cavity 190 holds valve return spring 192 which bears against valve retainer and adjustment nut 194. The nut 194 contains fuel passages 196 communicating with chamber 190 and fuel delivery passages 198 as in other embodiments. The valve retaining nut holds valve stem 200 with valve head 202. The valve comprised of stem 200 and head 202 slides through injector tip 204 just as with the first embodiments. It includes the threaded section with upper edge 206 and, as stated before, cavity 190, with the cavity being of such size that it is smaller in diameter than retaining nut 194. Thus when the injector is in the final delivering mode, retaining nut 194 will engage the upper edge 206 of injector tip 204. Nut 194 is adjustable to infinitely vary the travel of valve 202.

FIG. 8 shows a variation of the embodiment in FIG. 7 including the injector body generally designated by the number 200. In this instance, fuel line 52 enters the top of the injector body to engage with threads 222 and below which is the filter cavity 224. The plunger in this form of the embodiment can be seen to be horizontal and includes plunger body 228 actuated by solenoid 230 and which is held in its normal off position by return spring 232. The plunger includes peripheral delivery groove 234 which in its open mode aligns with central delivery passage 225. The fuel passes around the plunger through groove 234 and into reservoir chamber 236 via passage 238. The injector 220 is provided with tip 240 having valve stem 242 and head 244. Again, it is provided with the upper threadable section for engaging the injector body and has upper surface 246 and cavity 248 with valve return spring 250. Valve retaining nut 252 is threaded onto the valve stem as shown and it contains the fuel passages 254 which lead into the chamber 248 and to the delivery channels 256. Again, and as with the first embodiment, a finely atomized conical 360° spray pattern is generated when the injector is actuated by solenoid 230.

Figure 9:
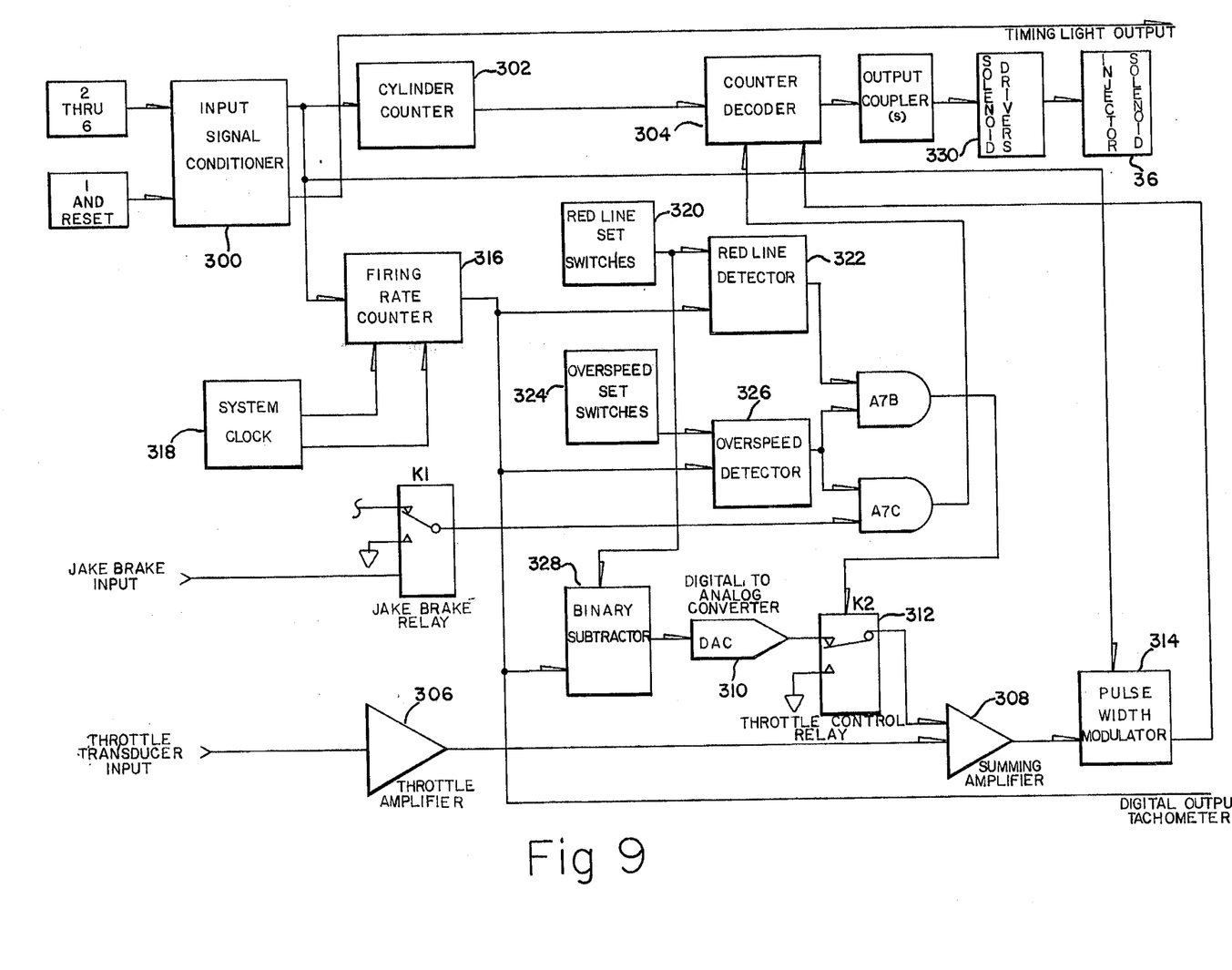
FIG. 9 is a block diagram of the electronic subcircuit components of this invention.
Figure 10:
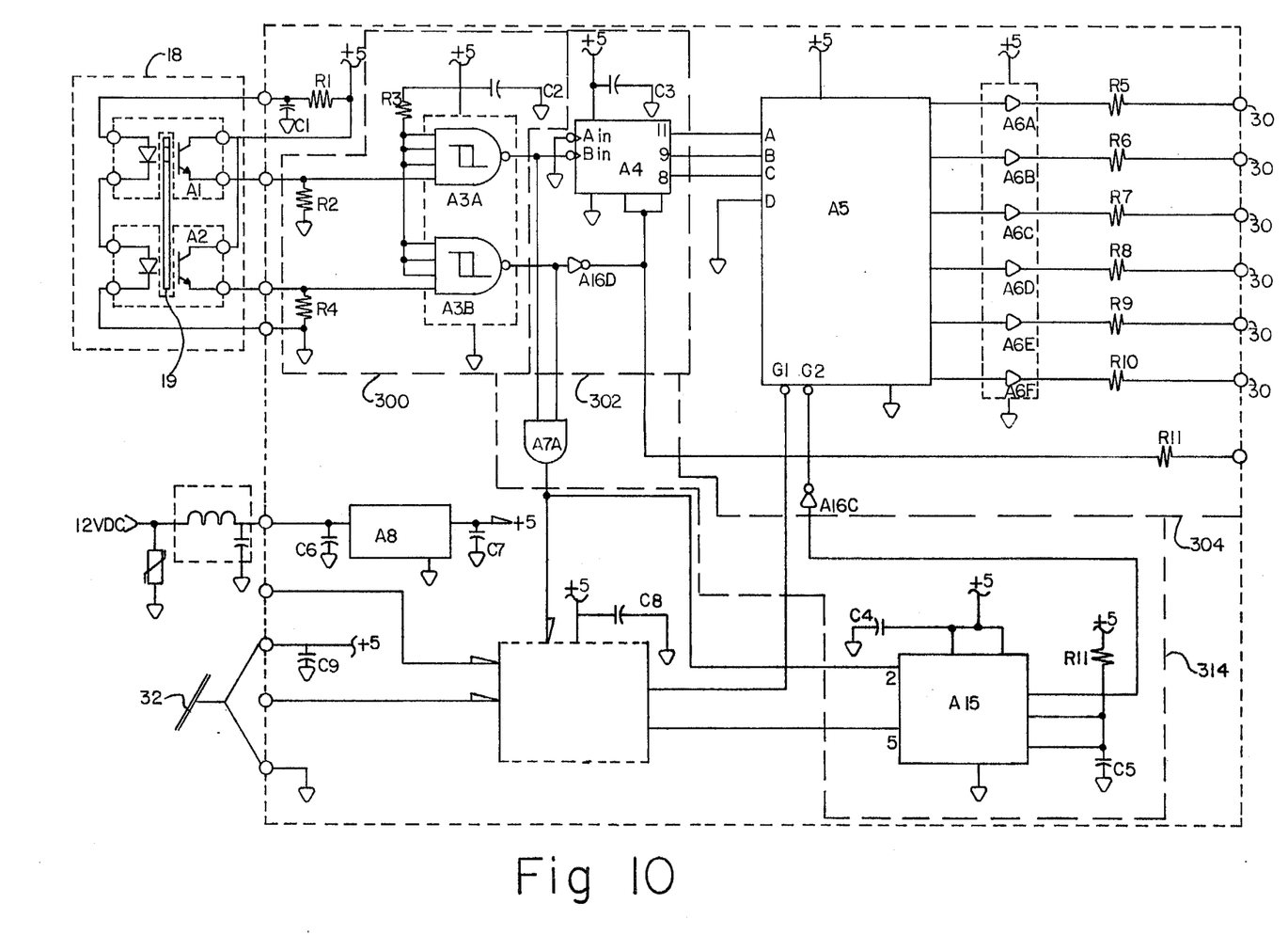
FIG. 10 is a schematic diagram of the electronic controls.
Figure 15:
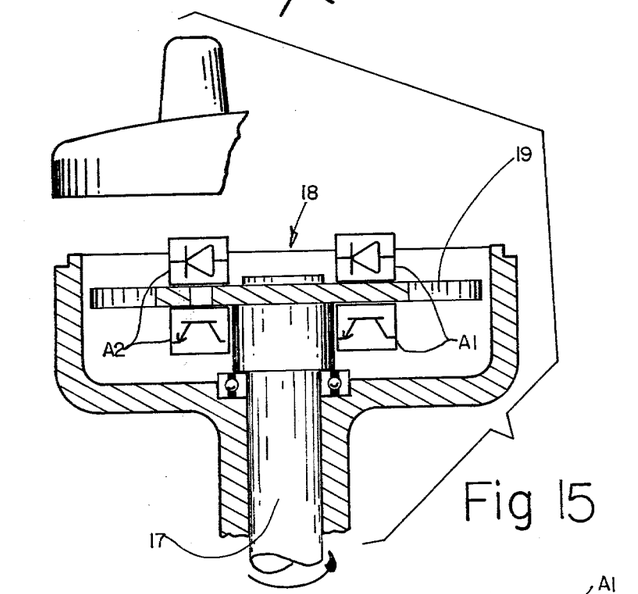
Figure 16:
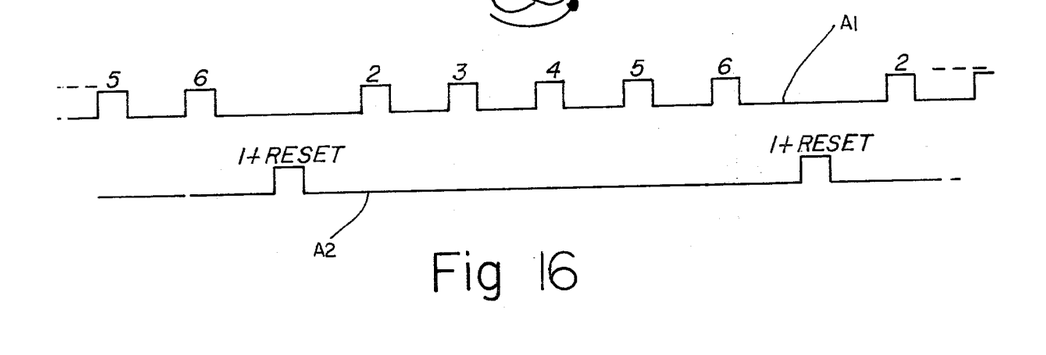
FIG. 16 is a pulse diagram to indicate the signal sequence output from the distributor.

FIGS. 9 to 16 are directed to the electronic controls. FIG. 9 is a block diagram of the subcircuits used in the system and FIG. 10 is an overall schematic of the controls. Distributor 18 as seen in FIGS. 10 and 15 is rotated by shaft 17 which is mechanically connected to the engine. Distributor 18 includes component optical sensor A1 which is a signal sensor to sense the firing point of cylinders 2–6. Optical sensor component A2 of distributor 18 provides the same thing for cylinder 1 and it is also a reset signal for the system which resets cylinder counter 302 IC component A4. Disc 19 is designed with a series of holes in which during rotation of the disc, hole 1 aligns with sensor A2 to trigger cylinder 1 and provide a reset signal as set forth above. Holes 2 through 6 are radially aligned on the disc at predetermined degrees of rotation to align with sensor A1 to fire cylinder 2 through 2 in the desired firing order. As is conventionally done, distributor 18 is rotatably adjustable to establish the initial timing and is also provided with conventional centrifugal weight and counter spring means (not shown) for advancing the timing as engine speed increases.

Components R1 and C1 are a decoupling filter which is used to provide a stable noise free signal to excite components A1 and A2. Component R1 is a current limiting resistor and C1 is a surge suppressing capacitor. Component R2 is a resistor which provides a current return path for the operation of the transistor portion of component A1 and component R4 provides the same function for the transistor part of A2. Input signal conditioner 300 includes dual Schmitt triggers A3A and A3B (FIG. 10) which provide signal conditioning for the counter. Trigger A3A provides signal conditioning for the counter input from cylinder sensor member A1, and component A3B provides a reset signal for the cylinder counter 302 and its IC component A4. Component A16D of counter 302 is merely an inverter to get the proper polarity reset signal into counter A4. Resistor R3 is called a pull-up resistor since it provides the proper logic level to the unused inputs of both A3A and A3B. Capacitor C2 is a decoupling capacitor and it is used to prevent noise from disrupting the circuitry operation.

IC component A4 is as stated above, the cylinder counter 302 and it provides a binary output in response to serial signals on the B input from conditioner 300 (FIG. 10). It will be noted that the A input to counter A4 is grounded and that there is no QA output from A4 because the QA portion does not function. The counter A4 is a divide by six network which would divide by six on its own without the reset. However, the reset pulse provided through sensor A2 in the distributor 18 is utilized to insure that a count is not missed and therefore, it resets on every two revolutions of the engine or every complete cycle of operation. Capacitor C3 is a decoupling capacitor used for the same reason as C2.

The counter decoder 304 consists of components A5, A6, A16C (FIG. 10). The function of this counter decoder is to take the binary output of the cylinder counter, convert it to a single signal and direct it to the appropriate solenoid driver 308.

Figure 11:
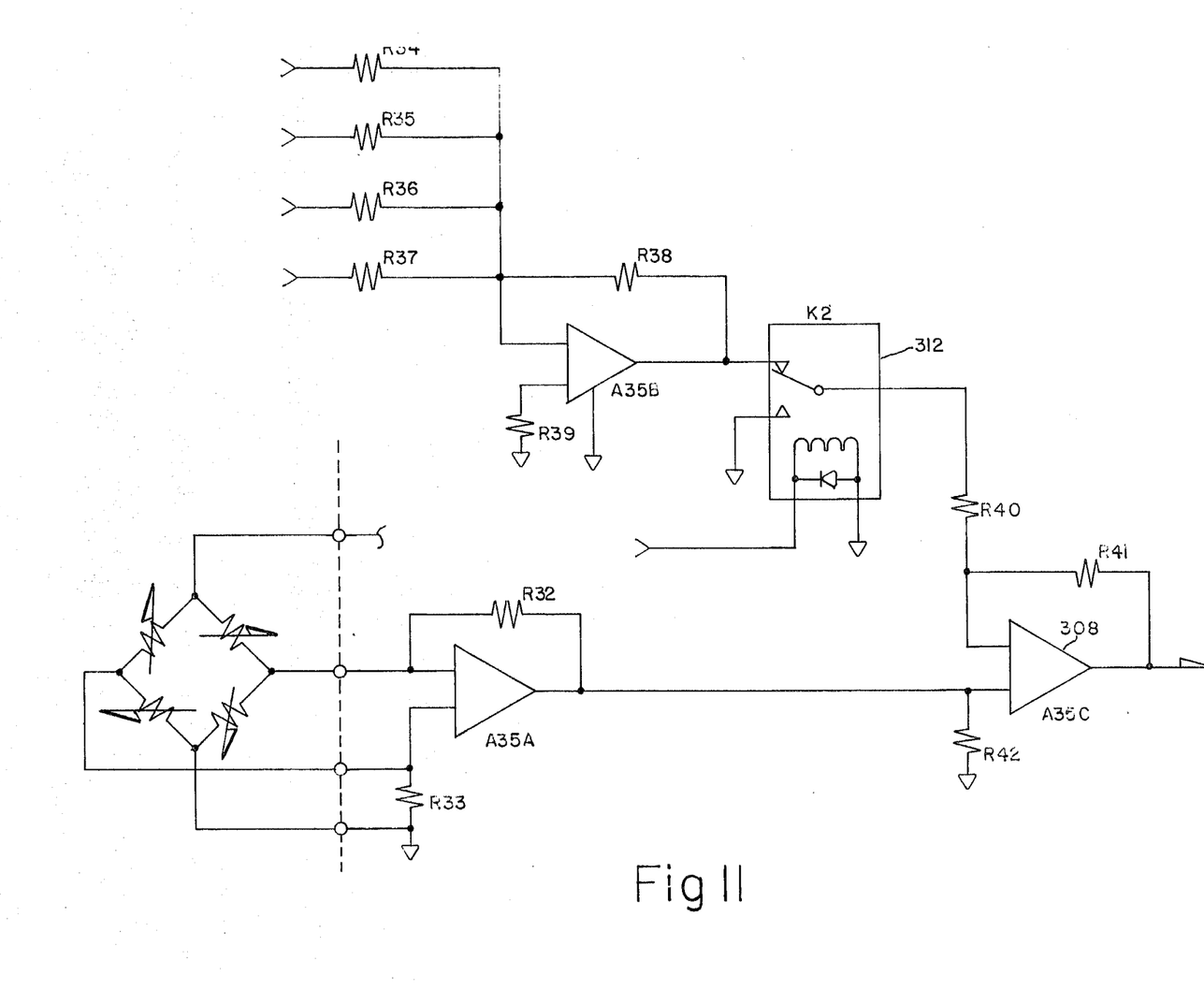
FIG. 11 is a schematic diagram of the throttle control circuitry.

The throttle 32 position is sensed by means of a transducer which will put out a nominal 0 to 50 millivolts corresponding to no throttle and to full throttle. This output will be sensed and conditioned in the overspeed and throttle control circuit of FIG. 11. The throttle transducer 307 shown in FIG. 11 supplies a signal to the Throttle Signal Amplifier 306 which consists of components A35A, R32 and $33. The output of the Throttle Signal Amplifier 306 is applied to the input of the Summing Amplifier 308, consisting of components A35C, R40, R41 and R42. The Summing Amplifier 308 also receives an input from the Digital-to-Analog Converter (DAC) 310 whose output is controlled by the Throttle Control Relay 312, consisting of components K2 (FIGS. 9 and 11).

Figure 12:
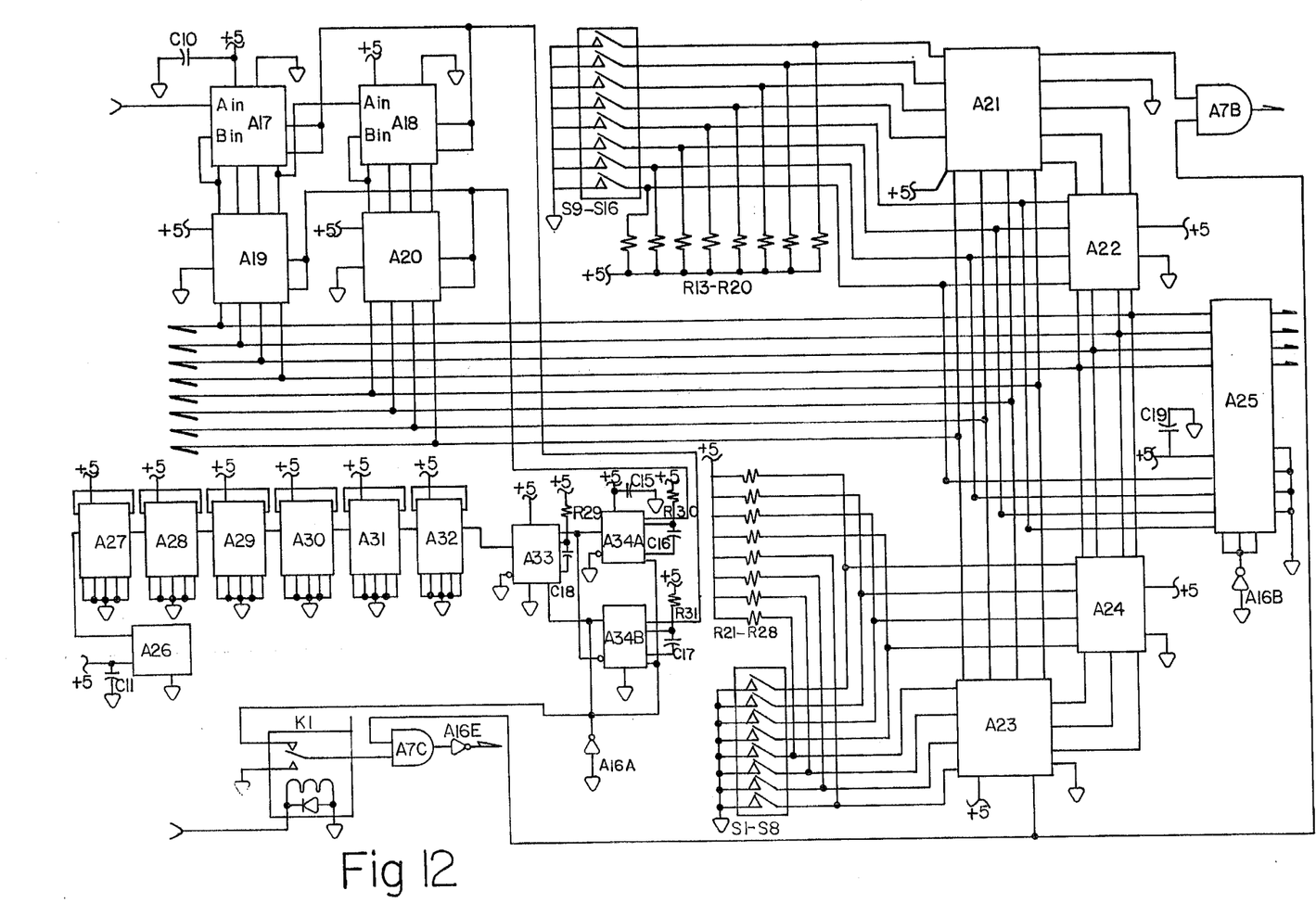
FIG. 12 is a schematic diagram of the overspeed control circuitry.

The following discussion describes the manner in which the signal, which is applied to the DAC 310 and the Throttle Control Relay 312, is generated. A signal from A7A in the pulse width modulator 314 (FIGS. 9 and 10) in the form of a pulse for each cylinder firing is applied to the input of the Firing Rate Counter 316 which consists of components A17 through A20 and C10 (FIGS. 9 and 12) a decoupling capacitor which functions in the manner of C2. A17 and A18 form a divide-by-128 counter whose output is stored in the latch consisting of A19 and A20. The counter reset signal and the counter latch signal are generated in the system clock 318 consisting of components A26 through A34, A16A, C11 through C18 and R29 through R31 (FIG. 12). Components C11 through C15 are decoupling capacitors. A26 is a 1 Megahertz crystal controlled oscillator. A27 through A32 comprise a divide-by-1 million counter, the output of which is a 1 hertz square wave. This output is applied to the input of a monostable multivibrator which is sensitive to the rising edge of the input signal, A33, whose output of 10 microseconds is controlled by timing components $29 and C18. The output signal from A33 is applied to the input of a monostable multivibrator, A34A, which is sensitive to the rising edge of the input signal and whose output of 1 microsecond, controlled by timing components R30 and C16, is the counter latch signal. The output signal from A33 is applied to the input of a monostable multivibrator, A34B, which is sensitive to the falling edge of the input signal and whose output of 1 microsecond, controlled by timing components R31 and C17, is the counter reset signal. Component A16A (FIG. 12) provides a Logic 1 signal for the proper operation of the various monostable multivibrators.

The sequential operation of the Firing Rate Counter 316 is described as follows:

A. The Counter Reset signal resets A17 and A18 to a zero output.

B. Engine firing pulses are accumulated in the counter for a period of 1 second.

C. The Counter Latch signal causes storage of this accumulated signal (a binary signal directly relating to engine RPM) in A19 and A20.

D. The Counter Reset signal resets A17 and A18 to a zero output and the sequence repeats.

Referring again to FIGS. 9 and 12, Engine Red-Line speed is selected by the Red-Line Set Switches 320 consisting of S9–S16, conditioned by R13–R20 and applied to the input of the Red-Line Detector consisting of A21 and A22. The output of the Firing Rate Counter 316 is also applied to the input of the Red-Line Detector 322. If the Firing Rate Counter 316 output is equal to or greater than the preset red line speed, an output will appear on A21 pin 7.

Similarly, engine overspeed (expected to be greater than red line speed) is selected by Overspeed Set Switches 324, made up of S1–S8, conditioned by R21–R28 and applied to the input of the Overspeed Detector.326 consisting of A23 and A24. The output of the Firing Rate Counter 312 is also applied to the input of the Overspeed Detector 326. If the Firing Rate Counter output is equal to or greater than the preset overspeed, an output will appear on A23 pin 7. Engine Red-Line Set Switches 320 and Overspeed Set Switches 324 can be replaced by Programmable-Read-Only-Memories (PROM's) which are factory manufactured for particular engine speeds.

The four least-significant-bits (LSB's) of the output from the Firing Rate Counter 316 and the four LSB's of the output from the Red Line Set Switches 320 are applied to the Binary Subtractor 328 consisting of A25, whose output is a binary representation of how far the engine is beyond red-line speed. C19 is a decoupling capacitor and A16B provides a Logic 1 for the proper operation of A25. The output of the Binary Subtractor 328 is applied to the input of the DAC 310 which consists of components A35B and R34 through R39 (FIGS. 9 and 11).

The outputs of the Red-Line Detector 322 and the Overspeed Detector 326 are combined in gate A7B (FIG. 9) whose output is used to control the throttle control relay 312 (FIGS. 9 and 11). If either (or both) detectors have an output, the DAC 310 output is applied to the input of the Summing Amplifier 308 via 312 and utilized as an offset signal to counter the signal from the Throttle Signal Amplifier 306.

Figure 13:
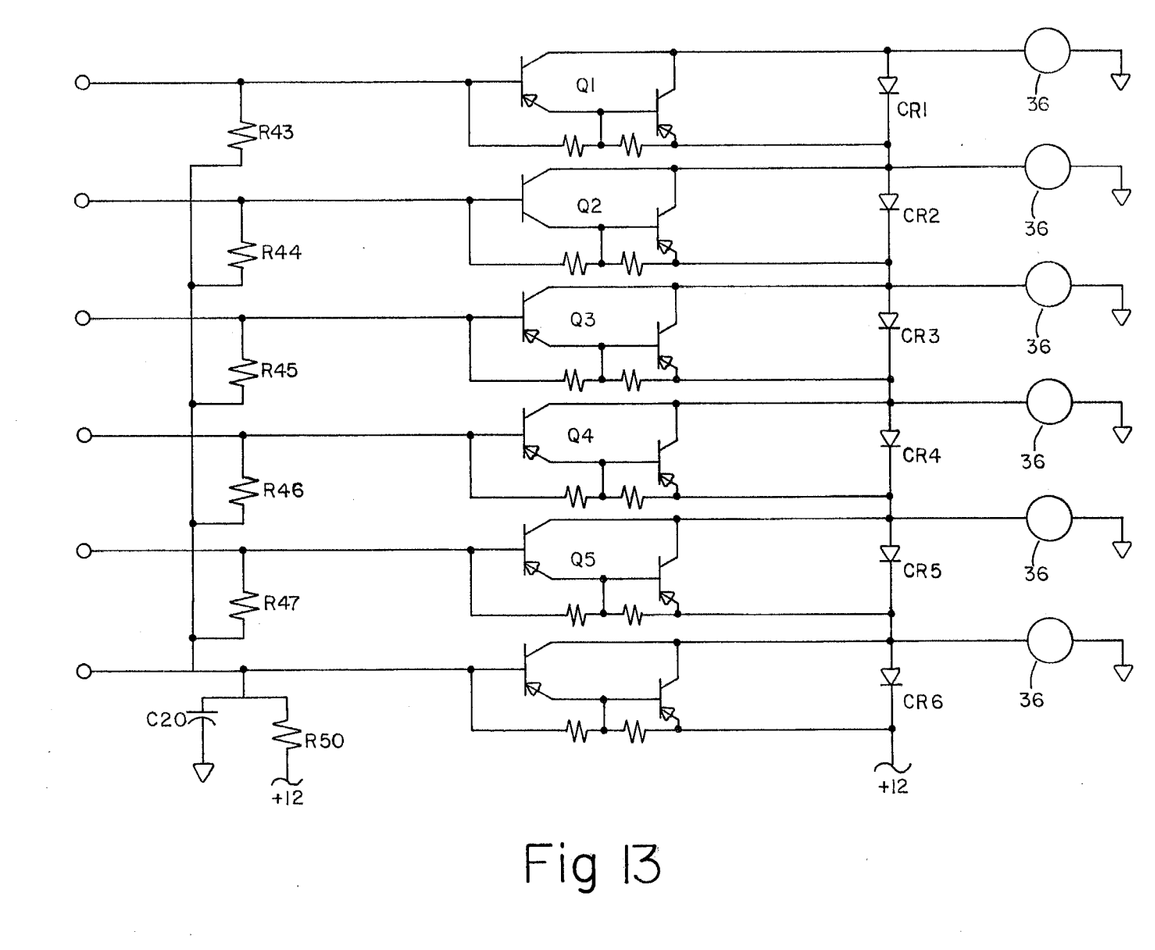
FIG. 13 is a schematic diagram of the solenoid driver and injector solenoid circuits.
Figure 14:
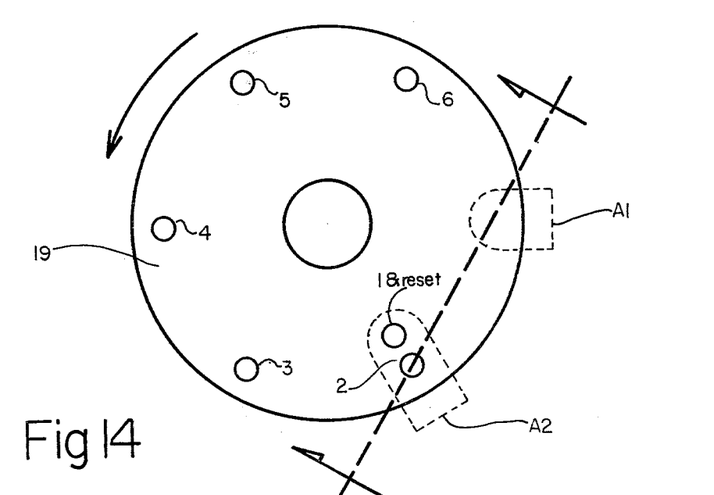
FIGS. 14 and 15 illustrate details of the construction of the distributor mechanism for the system.

If the Overspeed Detector 326 has an output, or if Jake Brake command is sensed via relay K1 (FIGS. 9 and 12) a signal via A7C and A16E is applied to the G1 gate input to A5 (FIG. 10) causing all outputs to be turned off. The output of the overspeed and throttle control will be a modulation input signal to the pulse width modulator 314 which contains IC component A15 (FIG. 10). There are three decoupling capacitors associated with this circuitry, namely C4, C8 and C9 the function of which is identical to that of component C2 in the input signal conditioner (FIG. 10). The pulse width modulator 314 timing components are R11 and C5 which establish a maximum pulse width from the pulse width modulator under any conditions. The modulator is controlled by input pin 5 as an output from the throttle control and overspeed control system. Nominally a 0.65 V signal will produce a pulse width somewhat less than one millisecond, where a signal approaching 5 volts into pin 5 of A15 will yield approximately 8 millisecond pulse widths. The output of the pulse width modulator is applied to counter decoder 304 gate input via inverter A16C (FIG. 10) so that which ever one of the outputs corresponding to cylinders 1-6, is enabled as a function of the counter decoder, the pulse from the pulse width modulator 314 will pass through the selected output to operate the solenoid driver 330 which will in turn operate the solenoid 36 for the selected injector. The solenoid drivers consist of components R43 through R50, C20, Q1 through Q6, and CR1 through CR6 (FIG. 13).

The operation of one (of six) channels will now be discussed. A cylinder 1 signal is received from the Counter Decoder 304 via A6A and R5 (FIG. 10). This signal is applied to the base connection of Q1 (FIG. 13) which amplifies it and passes it on to cylinder 1 Injector Solenoid 36. Components R43 through R50 and C20 (FIG. 13) provide electrical bias for the proper operation of the Solenoid Driver transistors. Components CR1 through CR6 (FIG. 13) are pulse supression diodes and incorporated to prevent the fly-back pulses from the collapsing fields of the Injector Solenoids from destroying Q1 through Q6 and associated components.

Components A8 and associated capacitors C6 and C7 provide a voltage regulator network as best seen in FIG. 10 to provide a stable 5 volt output to the logic in this electronic system when energized by the truck's nominal 12 volt power. Components C6 and C7 provide two functions. One is a decoupler similar to capacitor C2. With regard to component C6 it provides stabilization for the correct operation of module A16. The decoupling filter on the input is very similar to decoupling network used in all automotive functions to eliminate such things as generator noise or alternator noise from the truck's electrical system.

What is claimed is:

1. Fuel injector mechanism for diesel engines, comprising:

(a) an elongated generally cylindrical injector body member having an upper end and a lower end and an internal plunger bore, said body also being provided with fuel line connection means and first fuel passage means opening into and for admitting fuel under pressure to said bore, said injector body also having a reservoir in the lower portion thereof and opening at said lower end, (b) an injector tip member having an upper connection end and a lower dispersal end designed to be detachably secured by its connection end to the lower end of said injector body, said tip member having a generally centrally located cavity which opens upwardly so that said body reservoir and tip member cavity together form essentially a common chamber, said tip member having an axial valve stem guide bore extending from said cavity and opening at the dispersal end thereof, said tip member also being provided with at least one fuel delivery channel means extending generally axially parallel with said guide bore from said cavity to said fuel dispersal end, (c) a cylindrical plunger member axially slidably received in said plunger bore and having an inner end and having an outer end which is connected to a plunger actuator means for operatively moving said plunger into an open position from a normally closed position for allowing fuel from said plunger body first fuel passage means to pass by said plunger, (d) second fuel passage means for allowing said fuel to pass from said bore to said reservoir chamber, (e) an elongated valve member having a stem portion extending thru and being axially slidable within said guide bore and having a fuel dispersal head at the outer end thereof, said stem portion extending upwardly through said cavity and into said reservoir chamber and detachably receiving at the upper end thereof a valve retaining and adjustment member including stop means for limiting the downward movement of said adjustment member and said valve stem and having fuel delivery passage means therein for permitting fuel to pass therethrough to said cavity and fuel delivery channels, and (f) a first spring means in said cavity for resiliently biasing said adjustment member upwardly and above said stop means and also biasing said valve member upwardly to hold said dispersal head against said dispersal end in a normally closed position, and second resilient spring means in said internal bore for biasing said plunger member into said normally closed position.

2. The fuel injector mechanism according to claim 1 and in which said cavity of said tip member is of smaller diameter than said reservoir so that an annular radially inwardly offset surface is defined at said upper connection end and which forms the stop means for said adjustment member.

3. The fuel injector mechanism according to claim 2 and in which said adjustment member is of greater diameter than said cavity.

4. The fuel injection mechanism of claim 2 and in which said tip member externally is of generally frusto-conical shape, such that it tapers downwardly and inwardly from said upper connection end.

5. The fuel injection mechanism of claim 1 and in which said fuel delivery channel means of said tip member comprises at least two generally equispaced channels which open into said guide bore generally along substantially the entire length of said guide bore.

6. The fuel injector mechanism of claim 1 and in which said plunger bore is generally axially disposed within said body.

7. The fuel injector mechanism of claim 1 and in which said plunger bore is generally radially disposed with respect to said body.

8. Fuel injector mechanism for diesel engines, comprising:
 (a) an elongated generally cylindrical injector body member having an upper end and a lower end and an internal plunger bore, said body also being provided with fuel line connection means and first fuel passage means opening into and for admitting fuel under pressure to said bore, said injector body also having a reservoir chamber generally in the lower portion thereof,
 (b) an injector tip member having an upper connection end and a lower dispersal end designed to be detachably secured by its connection end to the lower end of said injector body, said tip member having a generally centrally located cavity which opens upwardly into said reservoir chamber such that a stop surface is defined, said tip member having an axial valve stem guide bore extending from said cavity and opening at the dispersal end thereof, said tip member also being provided with at least one fuel delivery channel means extending generally axially from said cavity to said fuel dispersal end,
 (c) a cylindrical plunger member slidably received in said plunger bore and having an inner end and having an outer end which is connected to a plunger actuator means for slidably moving said plunger into an open position for allowing fuel from said plunger body first fuel passage means to pass said plunger,
 (d) second fuel passage means interconnecting with said first fuel passage, when said plunger is in its open position for allowing said fuel to pass from said bore to said reservoir chamber,
 (e) an elongated valve member having a stem portion extending thru said guide bore and a fuel dispersal head at the outer end thereof, said stem portion extending upwardly through said cavity and into said reservoir chamber and threadably receiving at the upper end thereof a valve retaining and adjustment member, said adjustment member being of such diameter that it engages said stop surface and having fuel delivery passage means therein for permitting fuel to pass therethrough to said cavity and fuel delivery channels, and
 (f) a first spring means in said cavity for resiliently biasing said adjustment member upwardly and above said offset surface and biasing said valve member upwardly to hold said dispersal head against said dispersal end in a normally closed position, and second resilient spring means in said internal bore for biasing said plunger member into a normally closed position.

9. The fuel injector mechanism according to claim 8 and in which said plunger is axially disposed and is provided with a peripheral groove which is aligned with said first fuel passage means and which allows fuel to pass said plunger and into said second fuel passage.

10. The fuel injector mechanism according to claim 9 and in which said second fuel passage means is located in said plunger member.

11. The fuel injector mechanism according to claim 10 and in which a plunger valve means is disposed between said second fuel passage means and said reservoir chamber.

12. The fuel injector mechanism of claim 11 and in which said plunger valve means is a ball check valve which is opened by downward movement of the plunger so that said ball is engaged by said valve stem to unseat it and allow fuel to pass into said reservoir chamber and through said adjustment member and said tip member and out of said dispersal end.

13. The fuel injection mechanism of claim 8 and in which said tip member externally is of generally frusto-conical shape, such that it tapers downwardly and inwardly from said upper connection end to said dispersal end.

14. The fuel injection mechanism of claim 8 and in which said fuel delivery channel means of said tip member comprises at least two generally equispaced channels which open into said guide bore generally along substantially the entire length of said guide bore.

15. Fuel injector mechanism for diesel engines, comprising:
 (a) an elongated generally cylindrical injector body member having an upper end and a lower end and an internal plunger bore, said body also being provided with fuel line connection means and first fuel passage means opening into and for admitting fuel under pressure to said bore, said injector body also having a reservoir in the lower portion thereof and opening at said lower end,
 (b) an injector tip member having an upper connection end and a lower dispersal end designed to be detachably secured by its connection end to the lower end of said injector body, said tip member having a generally centrally located cavity which opens upwardly so that said body reservoir and tip member cavity together form essentially a common chamber, said tip member having an axial valve stem guide bore extending from said cavity and opening at the dispersal end thereof, said tip member also being provided with at least one fuel delivery channel means extending generally axially parallel with said guide bore from said cavity to said fuel dispersal end,
 (c) a cylindrical plunger member axially slidably received in said plunger bore and having an inner end and having an outer end which is connected to a plunger actuator means for operatively moving said plunger into an open position from a normally closed position for allowing fuel from said plunger body first fuel passage means to pass said plunger,
 (d) second fuel passage means in said body interconnecting with said first fuel passage when said plunger is in its open position and being interconnected to said reservoir for allowing said fuel to pass from said bore to said reservoir,
 (e) an elongated valve member having a stem portion extending thru and being axially slidable within said guide bore and having a fuel dispersal head at the outer end thereof, said stem portion extending upwardly through said cavity and into said common chamber and detachably receiving at the upper end thereof a valve retaining and adjustment member including stop means for limiting the downward movement of said adjustment member and said valve stem and having fuel delivery passage means therein for permitting fuel to pass therethrough to said cavity and fuel delivery channels, and (f) a first spring means in said cavity for resiliently biasing said adjustment member upwardly and above said stop means and also biasing said valve member upwardly to hold said dispersal head against said dispersal end in a normally closed position, and second resilient spring means in said internal bore for biasing said plunger member into said normally closed position.

16. The fuel injector mechanism according to claim 15 and in which said cavity of said tip member is of smaller diameter than said reservoir so that an annular radially inwardly offset surface is defined at said upper connection end and which forms the stop means for said adjustment member.

17. The fuel injector mechanism according to claim 16 and in which said adjustment member is of greater diameter than said cavity.

18. The fuel injector mechanism of claim 11 and in which said tip member externally is of generally frusto-conical shape, such that it tapers downwardly and inwardly from said upper connection end.

19. The fuel injector mechanism of claim 15, and in which said fuel delivery channel means of said tip member comprises at least two generally equispaced channels which open into said guide bore generally along substantially the entire length of said guide bore.

20. The fuel injector mechanism of claim 15 and in which said plunger bore is generally axially disposed within said body.

21. The fuel injector mechanism of claim 15 and in which said plunger bore is generally radially disposed within said body.

22. A fuel injector system for a diesel engine in which said engine is provided with a fuel tank, common rail, foot throttle control, distributor driven by said engine, and an excess fuel return line from the common rail to said tank comprising:

(a) pump means driven by said engine for creating a standing high pressure wave within said common rail, (b) non-pressure generating fuel injector means for each cylinder of said engine and connected to said common rail and in which each of the said injectors includes valve means, said valve means being operatively connected to an actuating solenoid mounted on said injector for moving said injector valve means to an open position to allow fuel to pass through said injector and into said cylinder, (c) distributor means for generating electronic first and second input signals in accordance with engine speed, (d) throttle position responsive electronic control means for generating an electronic third input signal, and (e) an electronic control unit which accepts said first, second and third signals for determining time of beginning fuel injection and for determining duration and thus the quantity of said fuel injection in accordance with said engine speed and load demands, said electronic control unit being operatively connected to said injector actuating solenoids so that said solenoids can be energized at electronically predetermined instances of time with respect to cylinder piston position and for electronically predetermined durations of time.

23. The fuel injection system according to claim 22 and in which a first and second input signal conditioner is provided for receiving said signals from said distributor to amplify and shape said signals.

24. The fuel injector system of claim 23 and in which a cylinder counter, firing rate counter, and pulse width modulator are provided to receive out-put signals from said signal conditioner.

25. The fuel injection system according to claim 24 and in which a counter decoder means is provided to receive binary signals from said cylinder counter and signals from said pulse width modulator for directing a single signal to the appropriate driver for an injector solenoid.

26. The fuel injector system according to claim 24 and in which a throttle amplifier means is provided for receiving said third input signals from said throttle position-responsive means and for directing amplified signals to said pulse width modulator.

27. The fuel injector system according to claim 22 and in which said distributor is provided with a rotatable disc member attached to a motor-driven shaft and which disc member is provided with radially aligned holes corresponding to the number and firing order of cylinders in said engine and through which holes light emitting and first and second signal-generating optical couplers generate signals according as a predetermined hole passes an optical coupler as said disc rotates.

28. The fuel injector system according to claim 27 and in which said distributor includes first and second optical couplers, said first of which provides said first input signal for one cylinder and said record of which provides said second input signal for the remaining cylinders.

29. The fuel injector system according to claim 28 and in which a throttle control circuit including a throttle transducer for generating said third input signal in response to throttle position, a throttle amplifier, a throttle control relay and a summing amplifier for maintaining and generally holding the engine to a speed corresponding to load and vehicle speed requirements.

* * * * *